DELAY LINE ASSEMBLER OF DATA CHARACTERS

Filed Oct. 21, 1964 7 Sheets-Sheet 1

INVENTOR
R. E. SWIFT
BY R C Lipton
ATTORNEY

FIG. 4 CHARACTER CASCADE

DELAY LINE ASSEMBLER OF DATA CHARACTERS

Filed Oct. 21, 1964 7 Sheets-Sheet 5

TRANSLATOR

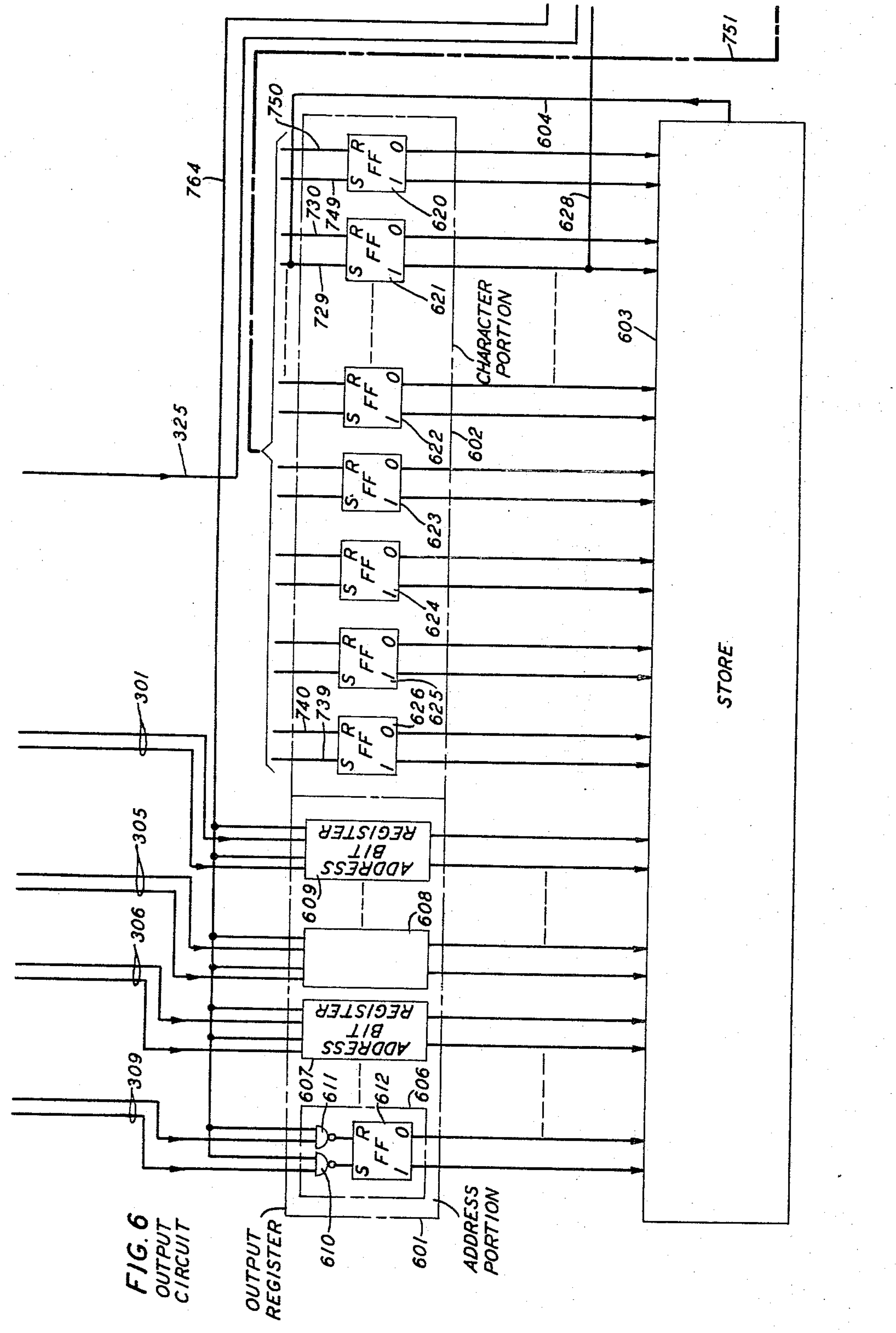
FIG. 6 OUTPUT CIRCUIT

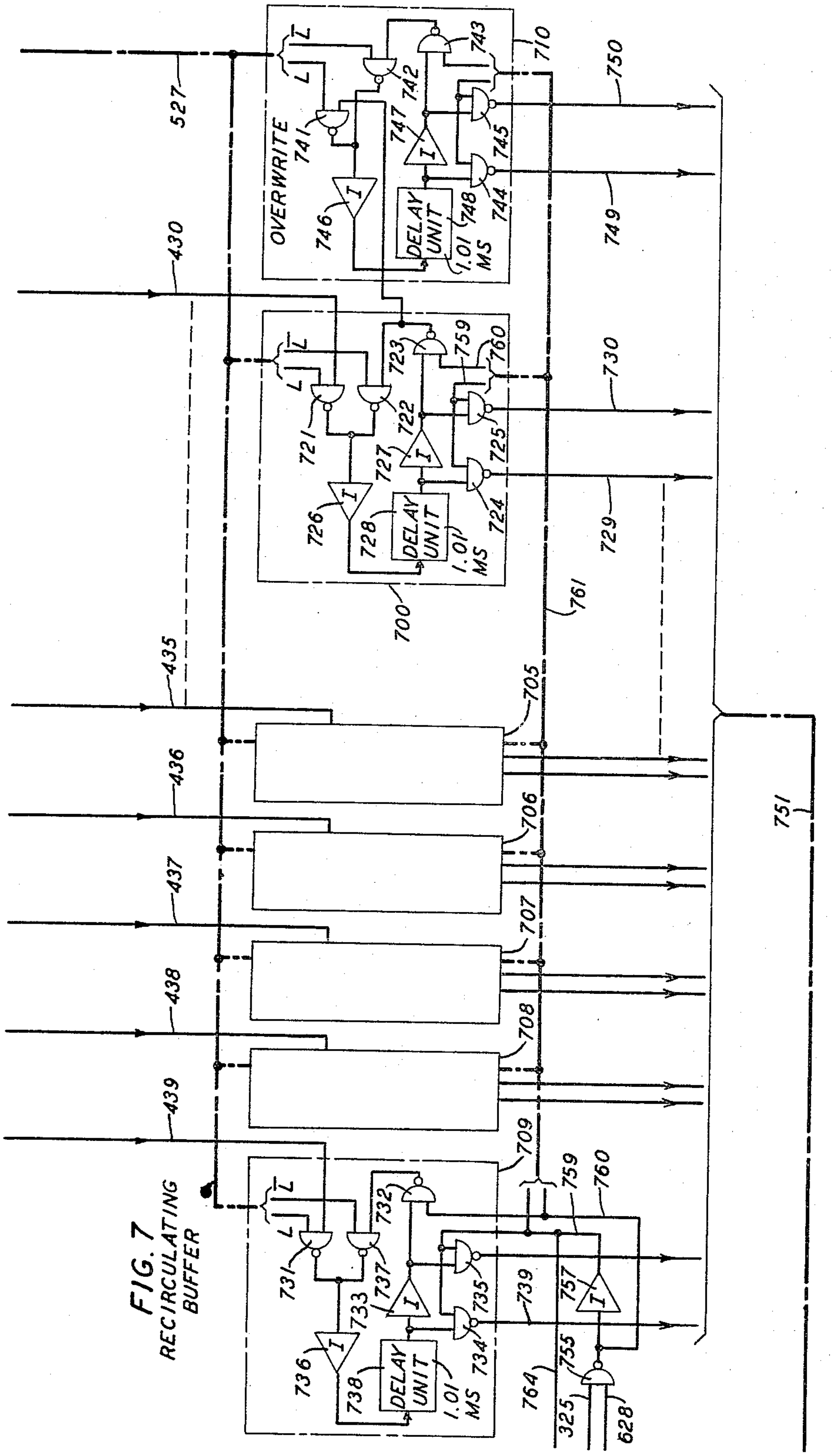
FIG. 7 RECIRCULATING BUFFER

United States Patent Office 3,340,514

Patented Sept. 5, 1967

3,340,514
DELAY LINE ASSEMBLER OF DATA CHARACTERS

Roger E. Swift, Fair Haven, N.J., assignor to Bell Telephone Laboratories, Incorporated, New York, N.Y., a corporation of New York Filed Oct. 21, 1964, Ser. No. 405,429
8 Claims. (Cl. 340—172.5)

ABSTRACT OF THE DISCLOSURE

Incoming serial data from a plurality of data lines dedicated to different signalling rates is arranged in parallel form by an assembler which scans the data lines, stores the interleaved character bits in a common multistage delay line arranged similar to a shift register, and thereafter reads out in parallel the bits in the delay line stages to an output register. Data lines having different signalling rates may be accommodated by varying the delay of the several delay line stages as each of the lines is scanned.

Figures 1, 8:
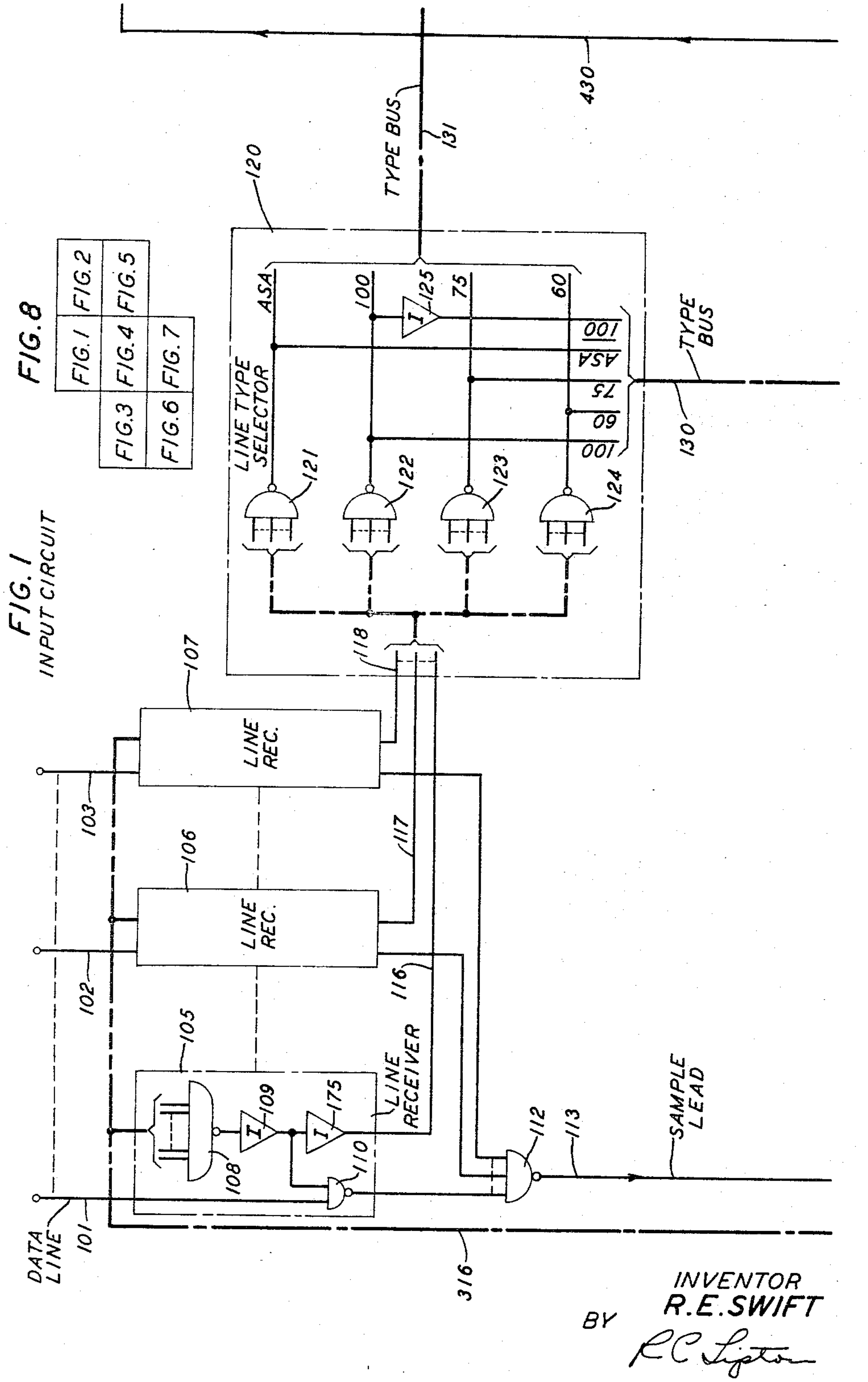

This invention relates to a delay line assembler of data characters, and, more particularly, to incoming line data character assemblers suitable for electronic store and forward data transmission systems.

It is a broad object of this invention to provide an improved delay line assembler for data characters.

Electronic store and forward switching centers accept data messages from subscriber lines operating at various signaling rates, temporarily store the message, or blocks thereof, in a memory circuit and deliver the messages to appropriate outgoing lines in accordance with routing codes in the heading of the message. An input line unit is provided for incoming lines to assemble data characters on a bit-by-bit basis and send the assembled character bits together with address characters identifying the incoming line to the memory. Each incoming line may be dedicated to a start-stop code utilizing, for example, five or eight intelligence elements with a speed of 60, 75, or 100 words per minute. In accordance therewith, each incoming line is provided with an individual timing or counting circuit which operates at a speed compatible with the line signaling speed to produce timing pulses to scan the center of each code element and assemble the bits scanned thereby in a shift register or cascade to form a complete character. The element bits thus assembled are then transmitted in parallel to the memory.

Accordingly, it is an object of this invention to assemble data characters received from a plurality of lines dedicated to different signaling rates.

It is another object of this invention to reduce the hardware dedicated to each incoming line.

It is a further object of this invention to share a common counting circuit and cascade among lines dedicated to different signaling rates.

It is an additional object of this invention to concurrently count a plurality of interleaved trains of bits.

In accordance with the illustrative embodiment of this invention disclosed herein, a line scanner sequentially samples all the incoming lines during each cycle thereof, the cycling rate being substantially greater than the highest signaling rate whereby each signal element is sampled a plurality of times. The interleaved bits thus obtained are serially applied to a character cascade comprising a plurality of delay stages. The character bits are thus passed serially through each successive stage subject to the stage delay. When the character is assembled in the cascade, pulses concurrent with each successive sampling of the line are applied to a binary counting circuit to produce a timing pulse to enable a buffer to read out in parallel the bits in the delay stages. Thereafter, the data bits are sent by way of an intermediate register to a memory or storage circuit.

It is a feature of this invention to change the delay of each cascade stage concurrently with the sampling of each line to correspond with the element duration of the code dedicated to the sampled line.

It is another feature of this invention to read out the character assembled in the cascade when the counter advances to a predetermined count concurrently with the sampling of the line which conveyed the character.

In accordance with a further feature of this invention each counting circuit stage includes a delay corresponding to the interval between the successive samplings of the incoming line whereby a plurality of interleaved trains of pulses, each pulse train coinciding with the successive samplings of a separate line, may be simultaneously handled on a time-share basis. The appropriate count is detected by a translator steering circuit enabled concurrently with the line sampling to discriminate against counts provided for other lines.

Figure 2:
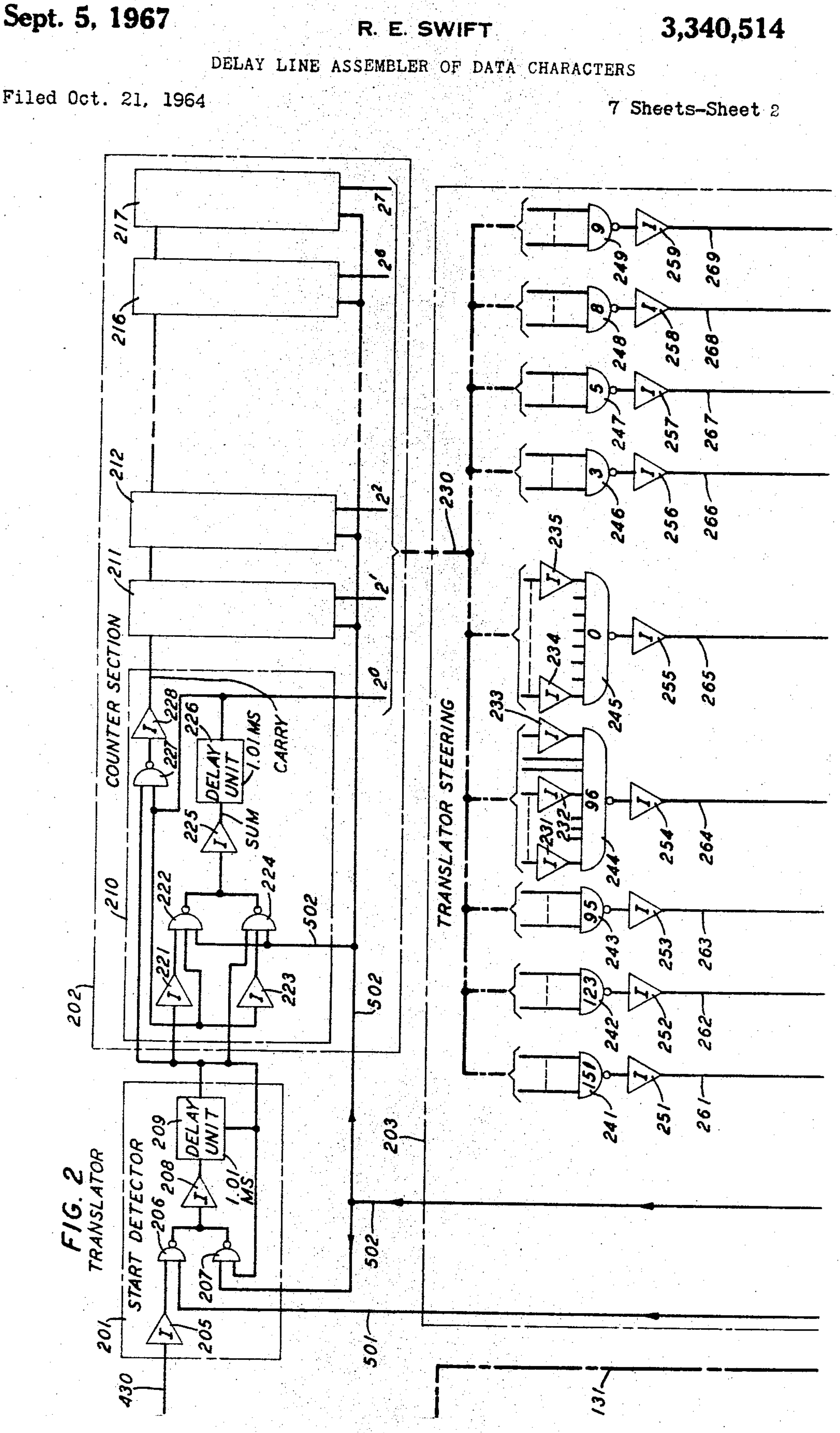
Figure 3:
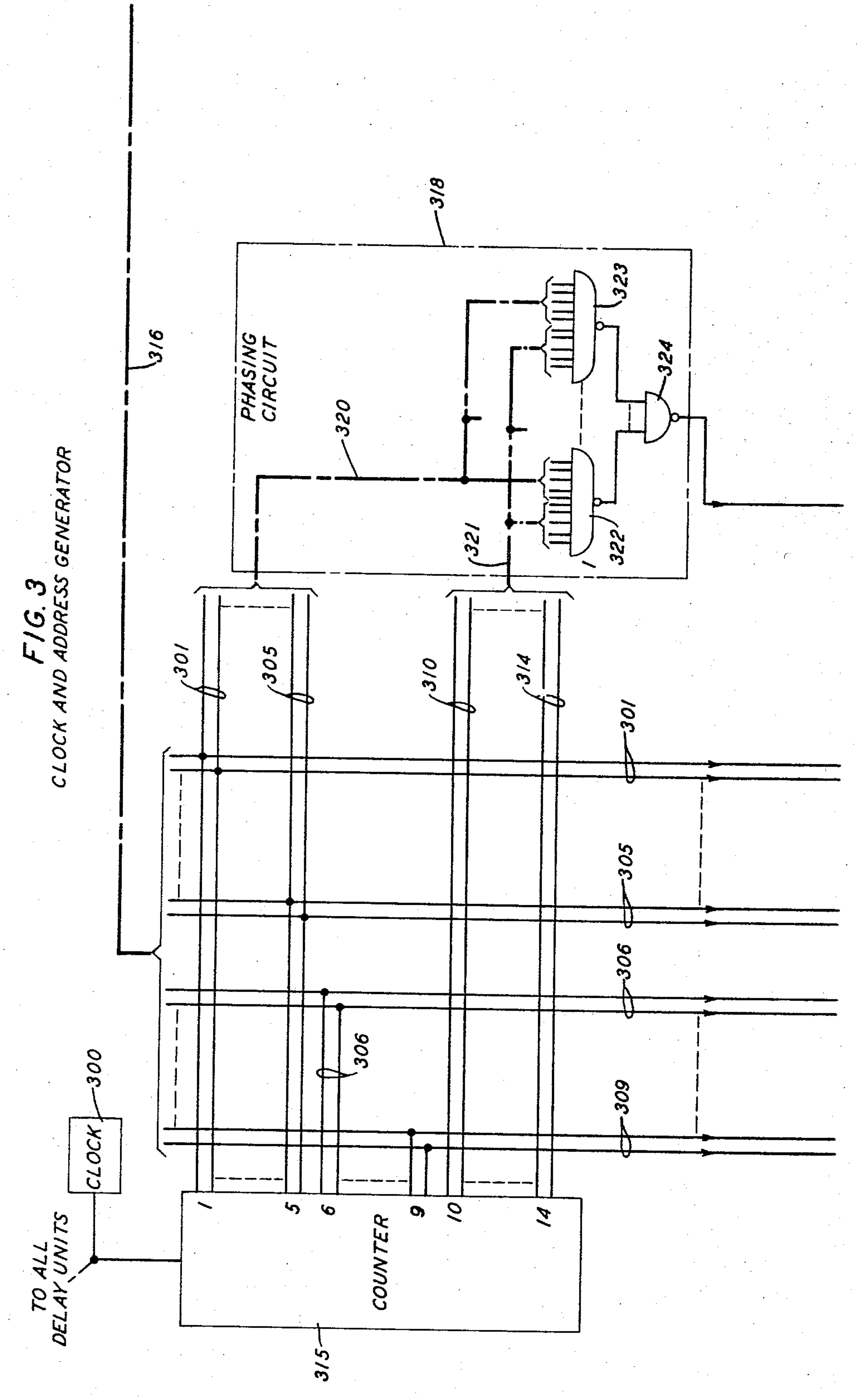
Figure 4:
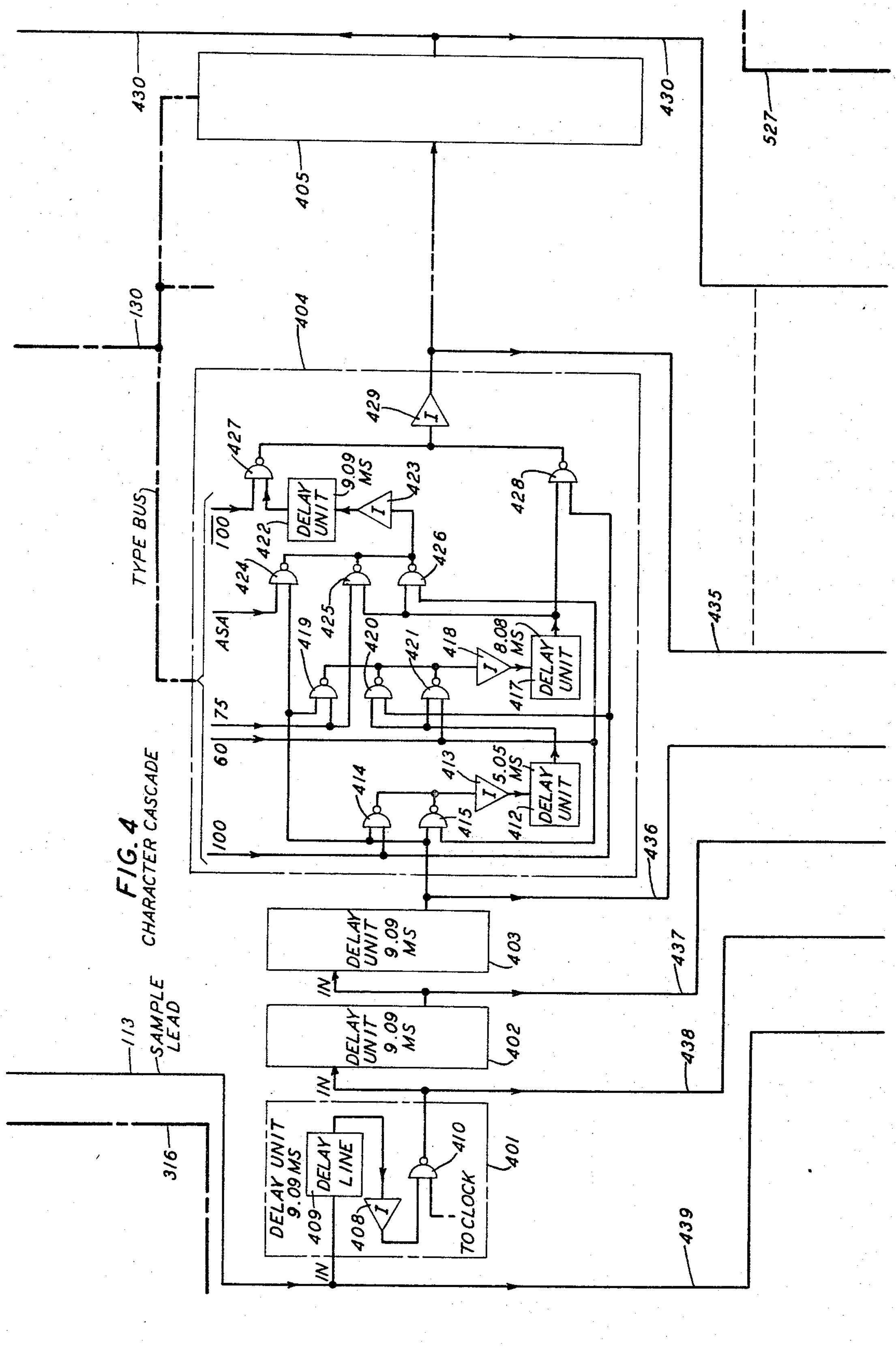
Figure 5:
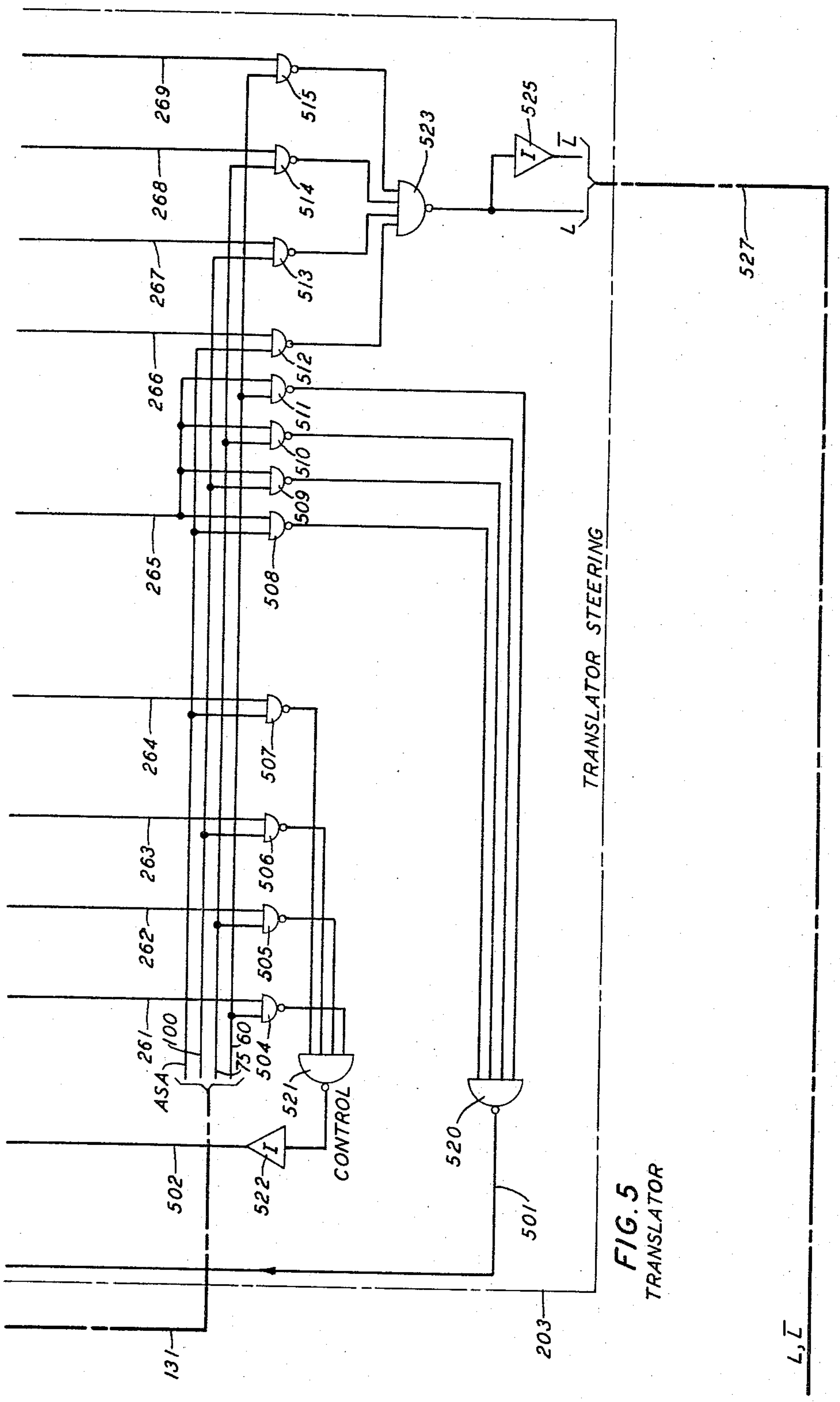

The foregoing and other objects and features of this invention will be more fully understood from the following description of an illustrative embodiment thereof taken in conjunction with the accompanying drawings wherein:

FIG. 1 shows incoming lines and associated line sampling circuits;

FIG. 2 together with FIG. 5 shows a counting circuit and associated translator steering circuit for detecting the appropriate counts;

FIG. 3 shows an address generator circuit which controls the sequential operation of the line sampling circuits;

FIG. 4 discloses a character cascade which stores the line sample bits;

FIG. 6 shows an output register connected to the input of a memory circuit;

FIG. 7 discloses a buffer circuit which reads out the data from the character cascade and thereafter passes the data to the output register; and FIG. 8 discloses the arrangement of FIGS. 1 through 7.

*Address generator*

The address generator shown in FIG. 3 includes a binary counter, generally indicated by block 315, which counter is driven by clock 300. Clock 300 has a frequency rate of about 507 kilocycles per second, providing a pulse every 1.97 microseconds. Each pulse from clock 300 functions to advance binary counter 315 one step. In addition, the output of clock 300 is also provided to all delay units, as described hereinafter.

Binary counter 315 includes 14 binary stages, each stage providing a double rail output. In FIG. 3 double rail output leads 301, 305, 306, 309, 310 and 314 are shown extending from the outputs of binary stages 1, 5, 6, 9, 10 and 14, respectively, of counter 315.

The first 9 stages of binary counter 315 provide a 512 counter or 512 time slots, each count or time slot designating the address for each of 512 incoming lines. Since the clock pulses occur every 1.97 microseconds, the lines are successfully addressed at the 1.97 microsecond rate and all lines are scanned in a 1.01 millisecond scan period. Leads 301 through 309, which constitute the double rail outputs of binary stages 1 through 9 of counter 315, are multiplied through cable 316 to the input circuit in FIG. 1 to provide the successive addressing of the input lines, as described hereinafter. In addition, double rail output leads 301 through 309 extend to the output circuit, FIG. 6, to provide the registration of the line address, as described hereinafter.

As previously disclosed, binary counter 315 includes, in addition to the 9 binary stages which provide the line addresses, 5 additional binary stages numbered 10 through 14. Accordingly, 32 line scan periods wherein the first 9 stages cycle 32 times occur during each complete cycling of counter 315. These additional output stages 10 through 14, together with the phasing circuit, generally indicated by block 318, provide a separation of the registration of the output signals. This is desirable for conventional storage circuits which cannot accept successive signals occurring only 1.97 microseconds apart.

Phasing circuit 318 is controlled by the double rail output leads 301 through 305, which extend from binary stages 1 through 5 of counter 315, which leads extend in multiple through cable 320. In addition, double rail output leads 310 through 314 of binary counter stages 10 through 14 extend to phasing circuit 318 through multiple cable 321. Phasing circuit 318 includes 32 gates, of which gates 322 and 323 are shown, together with output gate 324. Each of the 32 gates, such as gate 322, provide one match combination of a predetermined count of the first 5 binary stages together with a predetermined count of stages 10 through 14 of counter 315. Since the first 5 stages recycle 16 times for each advance of the count of stages 10 through 14, each gate provides 16 pulses for each cycling of counter 315 and the 32 gates generate a total of 512 pulses. Since each of these 512 pulses will occur in an individual one of the 512 time slots, and since the first 9 stages cycle 32 times for each recycling of the counter, the average interval between the output pulses of the 32 gates is approximately 62 microseconds, an interval which can be handled by a conventional storage circuit.

Assuming now that the 5 leads from double rail outputs 301 through 305 and the 5 leads from double rail outputs 310 through 314 which extend to gate 322 are all simultaneously in the high potential or "1" condition, the output of gate 322 will go to the low potential or "0" condition. With at least one of the input leads to gate 324 in the "0" condition, the output of gate 324 is driven to the "1" condition. Accordingly, a "1" bit is applied to output lead 325, which "1" bit corresponds to a predetermined data line address and occurs concurrently with the addressing of the line.

*Line sampling circuits*

As previously described 512 input data lines may be accommodated, lines 101, 102 and 103, FIG. 1, being typical of the data lines. Each data line is dedicated to convey a specific data code. In accordance with this embodiment, four start-stop codes are provided for, namely, Baudot 100 speed, Baudot 75 speed, Baudot 60 speed and ASA 100 speed codes. In the Baudot code, each character comprises a start element, five intelligence elements, and a stop element, the start and intelligence elements having a duration of one unit and the stop element having a 1.42 unit duration. The unit duration of the Baudot 100, 75, and 60 speed codes are 13.47, 17.57 and 22.0 milliseconds, respectively. The ASA code character comprises a start element, eight intelligence elements and two stop elements, all elements in the 100 speed code having a duration of 9.09 milliseconds.

Each data line is terminated by a line receiver such as line receiver 105, which terminates data line 101. Similarly, line receivers 106 and 107 terminate data line 102 and 103. Line receiver 105 includes gate 108 and extending to the input thereof is one lead of each of double rail leads 301 through 309. The strapping of the leads provide that when counter 315 addresses data line 101 all of the input leads to gate 108 are in the high potential or "1" condition. Accordingly, if line 101 is not being scanned, at least one lead has a "0" bit applied thereto and the output of gate 108 provides a "1" bit. This is inverted by inverter 109, applying a "0" bit to gate 110, whereby the output thereof is in the "1" condition when the line is not being addressed. The output of inverter 109 is also applied to inverter 115 which applies a "1" bit to lead 116 when data line 101 is not being scanned.

When counter 315 addresses data line 101, a "1" bit is applied to each of the input leads to gate 108, resulting in a "0" bit at the output of the gate. This "0" bit is inverted by inverter 109, and the consequent "1" bit is applied to gate 110. If data line 101 is in the marking condition, thus also applying a "1" bit to gate 110, the output of the gate goes to the "0" condition. This "0" condition is applied to an input lead of gate 112, and with the one input lead in the "0" condition, the output of gate 112 goes to the high potential or "1" condition. This "1" bit is then passed by way of lead 113 to the character cascade in FIG. 4, which circuit is described hereinafter.

In the event that a spacing signal is being received on data line 101, a "0" condition is applied to gate 110, resulting in the application of a "1" bit to gate 112. Assuming, at this time, that data line 101 is being addressed by counter 315, all other similar gates in the other line receivers have "0" bits applied thereto and consequently all input leads to gate 112 are in the "1" condition. Accordingly, this sampling of data line 101 results in the application of a "0" bit to lead 113, and thence to the character cascade in FIG. 4.

*Line type selector*

As previously described, the output of inverter 109 is also applied to inverter 115. Accordingly, when data line 101 is adressed, the "1" bit at the input of inverter 115 produces a "0" bit on lead 116. Conversely, when line 101 is not being addressed, inverter 115 provides a "1" bit on lead 116.

Leads 117 and 118 extend from line receivers 106 and 107, respectively, and in the same manner as previously described for lead 116, are provided with a "0" bit when the corresponding line is addressed, and a "1" bit when the line is not being addressed. Leads 116, 117 and 118 extend to the line type selector, generally indicated by block 120.

Line type selector 120 includes gates 121 through 124, wherein gate 121 is associated with data lines carrying ASA code and gates 122, 123 and 124 are associated with data lines carrying 100 speed, 75 speed and 60 speed Baudot codes, respectively. Assuming that data line 101 conveys ASA code, lead 116 is accordingly strapped to the input of gate 121. Similarly, in the event that data line 101 conveys 100, 75 or 60 speed Baudot code, lead 116 is strapped to the input of gates 122, 123 or 124. In the same manner, leads 117 and 118 and the corresponding leads extending from the other line receivers extend to gates 122 through 124 in accordance with the corresponding speeds or codes of the associated data lines.

As previously described, a "1" bit is provided to lead 116 when data line 101 is not being addressed, and, conversely, a "0" bit is provided to lead 116 when the data line is addressed. Accordingly, assuming data line 101 is conveying ASA code and the line is being addressed, a "0" bit is applied to the input of gate 121, thereby producing a "1" bit on the output lead, which lead is designated ASA. Thus, lead ASA, which is normally in the "0" condition, has a "1" bit applied thereto when a data line conveying ASA code is addressed. In a similar manner, the output leads of gates 122, 123 and 124, when they are designated leads 100, 75 and 60, have a "1" bit applied thereto when a data line conveying the corresponding code is addressed. In addition, lead 100 is connected by way of inverter 125 to "not 100" lead $\overline{100}$. Accordingly, lead $\overline{100}$ has a "1" bit normally applied thereto and a "0" bit applied when a 100 speed Baudot line is addressed. Leads ASA, 100, 75 and 60 are multiplied through cable 131 which extends to the translator shown in FIGS. 2 and 5. In addition, leads ASA, 100, 75 and 60, together with lead $\overline{100}$, are multiplied through cable 130 to the character cascade in FIG. 4.

*Character cascade*

The character cascade comprises 9 stages, 3 of the stages constituting delay units generally indicated by blocks 401, 402, and 403. In addition, the character cascade includes an initial switch stage, generally indicated by block 404, a final switch stage generally indicated by block 405, and 4 intermediate stages, not shown.

Delay unit 401 includes a magnostrictive delay line 409, inverter 408 and gate 410. Delay line 409 provides a delay of 9.09 milliseconds, as indicated in FIG. 4, and the output thereof is passed to gate 410 by way of inverter 408. It is noted that the delay of delay line 409 is exactly 9 times the data line scan period, that is, the 1.01 millisecond interval required to scan all the data lines.

The input to delay line 409 is provided by lead 113, which lead, as previously described, conveys the bits sampled by the line receivers. Accordingly, assuming that line 101 is addressed and a marking condition is sampled, a "1" bit is applied to delay line 409. Conversely, if data line 101 was in the spacing condition when scanned, lead 113 applies a "0" bit to delay line 409.

The next advance of counter 315 effects the sampling of the next one of the input data lines and the sampled condition of this data line is applied to delay line 409 in the same manner. Similarly, the rest of the data lines are sampled and the sampled bits are applied to delay line 409. At the conclusion of the first scan cycle, data line 101 is again addressed and this sampled bit is applied to delay line 409. Similarly, through a second scan cycle, the other lines are addressed and the sampled bits applied to delay line 409. This process is repeated for 9 scan intervals, each data line providing 9 bits concurrently stored in delay line 409. The 10th scan cycle starts 9.09 milliseconds after data line 101 was first addressed by again addressing line 101. Simultaneously therewith, the first sample bit appears at the output of delay line 409. This bit is inverted by inverter 408 and applied to gate 410. The other input to gate 410 is connected to clock 300 which is concurrently producing the pulse which advances counter 315 to address data line 101. Accordingly, if the first sampling of data line 101 produced a "1" bit, this bit now appears at the output of delay line 409, is converted to a "0" bit by inverter 408 and with a "1" bit being applied to gate 410 by clock 300, a "1" bit appears at the output of gate 410 corresponding to the first sampling of data line 101 and concurrently with the 10th sampling of the data line. Conversely, if the initial sampling of line 101 produced a "0" bit, a "1" bit is now applied to gate 410 by inverter 409 and with a "1" bit applied to the other input of gate 410 by clock 300, the output thereof produced is a "0" bit. The output of gate 410 constitutes the output of delay unit 401, which output is connected to the input of delay unit 402.

In the same manner, when the next data line is addressed in the 10th scan cycle, and the bit obtained thereby is applied to delay line 409, the output of delay unit 401 comprises a bit corresponding to the bit obtained from the data line in the first scan cycle. It is thus seen that each data line is sampled during an individual time slot in the scan cycle, and the sampled bit is applied to delay line 409 since the delay of delay unit 401 is exactly 9 times the scan period, the bit obtained at the output of delay unit 401 during that individual time slot corresponds to the prior sampling of the data line 9 scan cycles before.

It is noted that the delay of delay unit 401 corresponds to the duration of the ASA code elements. It is thus seen that when the initiation of an ASA code element is scanned and applied to the input of delay unit 401, the output of delay unit 401 is producing a bit corresponding to the initiation of the prior code element. Similarly, when the mid-point of an ASA element is scanned and applied to the input of delay unit 401, the output of delay unit 401 is passing a bit sample of the mid-point of the prior ASA code element.

Delay units 402 and 403 are identical to delay unit 401 and provide the same delay. Accordingly, each successive ones of delay units 401 through 403 are applying at the output thereof subsequent ones of the corresponding portions of the code elements when a data line conveying ASA code is being scanned. In addition, when a data line conveying one of the Baudot codes is being scanned, although the outputs of delay units 401 through 403 do not correspond with the same portion of the element, the bits at the output thereof were previously obtained from that line which is presently being scanned.

The output of delay unit 403 is applied to the input of switch stage 404. Switch stage 404 includes delay unit 412, which delay unit is similar to delay unit 401 with the exception that the delay line therein provides a delay of 5.05 milliseconds. It is noted that this delay is exactly 5 times the line scan interval. In addition, stage 404 includes delay unit 422, which is identical to delay unit 401, and delay unit 417 which provides an 8.08 millisecond delay, 8 times the line scan period.

Assuming now that a data line conveying ASA code is being scanned, line type selector 120 applies a "1" bit to lead ASA, which lead extends to gate 424 in switch stage 404. Simultaneously therewith, delay unit 403 is applying to stage 404 a bit obtained from a prior scanning of the ASA data line. If the output of delay unit 403 is a "1" bit, this "1" bit is also applied to gate 424 and the resultant "0" bit at the output thereof is inverted by inverter 423, thus applying a "1" bit to delay unit 422. Accordingly, 9 scan periods later, with the same ASA data line being scanned, delay unit 422 applies a "1" bit to gate 427 and simultaneously line $\overline{100}$ applies a "1" bit to the gate, producing at the output thereof a "0" bit which is inverted by inverter 429 to produce a "1" bit at the output of stage 404. It is thus noted that during the time slot when a data line conveying ASA code is being scanned, stage 404 provides the same 9.09 millisecond delay as provided by delay units 401 through 403. Similarly, each of the subsequent stages, including stage 405, provide a 9.09 millisecond delay when a data line conveying ASA code is addressed.

In the event that the output of delay unit 403 produces a "0" bit when an ASA data line is addressed, the application of this "0" bit to gate 424 applies a "1" bit at the output thereof and inverter 423 consequently applies a "0" bit to delay unit 422. Accordingly, 9 scan periods later a "0" bit is applied to gate 427 and the resultant "1" bit at the output thereof is converted to a "0" bit by converter 429 producing a "0" bit at the output of stage 404.

When a data line conveying a 100 speed Baudot code is addressed, a "1" bit is applied to lead 100, as previously described, which lead extends to gates 414, 420 and 428. During this time slot of the scan period, the output bit of delay unit 403 is a prior sampling of the 100 speed Baudot code data line. If this output comprises a "1" bit, which bit is also applied to gate 414, the resultant "0" bit at the output thereof is passed by inverter 413 to delay unit 412 in the form of a "1" bit. Accordingly, 5 scan periods or 5.05 milliseconds later, delay unit 412 applies a "1" bit to gate 420 and since the 100 speed Baudot line is again being addressed, lead 100 applies a "1" bit to the other input of gate 420, resulting in a "0" bit at the output thereof, which "0" bit is converted to a "1" bit by inverter 418 and applied to delay unit 417. Eight scan periods or 8.08 milliseconds later, the data line is again addressed, delay unit 417 produces a "1" bit at the output thereof, which "1" bit is presented to gate 428 together with the "1" bit from lead 100 and the "0" bit produced at the output thereof is inverted by inverter 429 and results in the application of a "1" bit to the output of stage 404. Totaling these cumulative delays of stage 404, this results in a delay of 13.13 milliseconds, which approximates the element duration of the 100 speed Baudot code. Accordingly, when a data line conveying a 100 speed code is being addressed, the scanned portion of the code elment produced at the output of stage 404 corresponds to the scanned portion of the subsequent code element being applied to the input of stage 404.

In the event that the output of delay unit 403 produces a "0" bit when a Baudot 100 speed line is addressed, the application of this "0" bit to gate 414 applies a "1" bit at the output thereof and inverter 413 consequently applies a "0" bit to delay unit 412. After 5.05 milliseconds, a "0" bit is produced at the output of delay unit 412 and gate 420 consequently provides a "1" bit which is converted to a "0" bit by inverter 418. This "0" bit is passed by delay unit 417 to gate 428 and the resultant "1" bit at the output thereof is inverted by inverter 429 producing a "0" bit at the output of stage 404.

Assuming now that a data line conveying a 75 speed Baudot code is addressed, the bit produced at the output of delay unit 403, corresponding to the prior sampling of the data line, is passed by gate 419 whose other input comprises lead 75. The output of gate 419 then passes by way of inverter 418 and delay unit 417 to gate 425 whose other input is connected to lead 75. The output of gate 425 then passes through inverter 423, delay unit 422, gate 427 and inverter 429 to the output of stage 404. In this case, it is noted, the cumulative delay is 17.17 milliseconds which approximates that unit interval of the 75 speed Baudot code.

If a 60 speed Baudot code data line is addressed, the sample bit at the output of delay unit 403 is passed through gate 415 whose other input is connected to lead 60. The output of gate 415 is then passed through inverter 413 and delay unit 412 to gate 421, the other input lead of gate 421 being connected to lead 60. The output of gate 421 is applied by way of inverter 418 and delay unit 417 to gate 426 and then by way of inverter 423, delay unit 422, gate 427 and inverter 429 to the output of stage 404. The cumulative delay in this case is 22.22 milliseconds which approximates the element interval of the 60 speed Baudot code element.

Summarizing, during the scan cycle time slot when a data line is addressed, the bit applied to the input of stage 404 corresponds to a prior sampling of the data line and the cumulative delay of stage 404 is arranged to be an integral multiple of the scan period and equal to the approximate duration of the element interval. Accordingly, the output bit of stage 404 during the time slot also corresponds to a prior sampling of the data line, which sampling occurred about one element interval before the sampling which produced the bit concurrently being applied to the input of stage 404.

Each sample bit at the output of stage 404 then proceeds through the intermediate stages and finally through stage 405 being delayed in each of the stages by an interval equal to an integral multiple of the scan period and corresponding to the element interval of the scanned data line. The output of stage 405 is then applied by way of lead 430 upwardly, as seen in FIG. 4 to the translator shown in FIGS. 2 and 5 and downwardly, as shown in FIG. 4, to the recirculating buffer of FIG. 7. The output of each of the other stages, such as stages 401, 402, 403 and 404, is also applied to the recirculating buffer of FIG. 7 by way of leads 438, 437, 436 and 435, respectively. In addition, the sample bits on lead 113 are passed to the recirculating buffer by way of lead 439.

Since, as previously described, stages 404 and 405, and the stages intermediate thereto, provide a delay corresponding to the element duration of the scanned data line, it is seen that when the initiation of the scan start element is applied to lead 430, the scanned bits of the start element are stored in stage 405, the scanned bits of the fifth intelligence element are stored in stage 404, and the scanned bits of the first four intelligence elements are stored in the intermediate stages. Thereafter, when the scanned bit corresponding to the approximate midpoint of the start element is applied to lead 430, the scanned bit corresponding to the midpoint of the fifth intelligence element is simultaneously applied to lead 435, the scanned bits corresponding to the midpoint of the other four intelligence elements are applied to leads intermediate 430 and 435, and with respect to Baudot codes the scanned bit corresponding to the midpoint of the stop element is applied to lead 436. Similarly, when an ASA code data line is addressed and the scanned bit corresponding to the midpoint of the start element is applied to lead 430, the scanned bit corresponding to the approximate midpoint of the first four elements of the eight intelligence elements are applied to the leads intermediate leads 430 and 435, the scan of the approximate midpoint of the latter four intelligence elements are applied to leads 435 through 438, with lead 439 conveying the bit corresponding to the approximate midpoint of the first stop element. It is thus seen that at a predetermined time slot or interval, leads 430 through 439 convey in parallel sample bits obtained at the midpoints of all the elements of a character from an individual one of the data lines. This particular predetermined time slot is determined by the translator shown in FIGS. 2 and 5.

*Translator*

The translator includes a start detector, generally indicated by block 201, FIG. 2, a counter section, generally indicated by block 202, and a translator steering section, generally indicated by block 203 and shown in FIGS. 2 and 5. Start detector 201 functions to recognize the start element transition bit obtained from the output of stage 405 and initiate the generation of a pulse train for application to counter section 202. Counter section 202 counts the pulses provided by start detector 201 and provides the count to translator steering section 203. Translator steering section 203 translates the count under control of line type selector 120, providing reset signals to start detector 201 and counter section 202 and determines the appropriate interval for gating the parallel bits on leads 430 through 439 to the recirculating buffer, FIG. 7.

*Start detector*

Start detector 201 is provided with delay unit 209 which is similar to delay unit 401 with the exception that delay unit 209 has a delay of 1.01 milliseconds corresponding to the line scan interval. In the initial condition, a "1" bit is normally applied to lead 502 from translator steering section 203 and thus to one input of gate 207, the other input of gate 207 being connected to the output of delay unit 209 which is normally providing a "0" bit. Thus, gate 207 applies a "1" bit to inverter 208 which, in turn, passes a "0" bit to the input of delay unit 209. Accordingly, start detector 201 is recirculating the "0" bit which bit appears at the output of the delay unit 209 and is applied to the input thereof concurrently with the addressing of an individual data line. Similarly, "0" bits corresponding to time slots of other idle data lines are recirculating through start detector 201, appearing at the output when the corresponding line is addressed. In addition, lead 501 from translator steering section 203, which lead extends to gate 206 from start detector 201, is normally in the "1" condition.

Prior to the application of the first sampling of the start element, hereinafter referred to as the start pulse transition, to lead 430 by character cascade stage 405, lead 430 has "1" bits applied thereto each time the data line is addressed, since the data line was in the idle marking condition or the stop element of the previous character was being sampled. This sampled "1" bit is applied to inverter 205 which, in turn, applies a "0" bit to gate 206. A "1" bit is therefore produced at the output of gate 206 and since, as previously described, a "1" bit is also produced at the output of gate 207, inverter 208 continues to apply a "0" bit to delay unit 209. Accordingly, concurrently with the addressing of the data line, delay unit 209 passes a "0" bit to counter section 202 and to gate 207. This "0" bit does not function to advance counter section 202 and the translator remains in the same condition.

When a start pulse transition is passed by stage 405, a "0" bit, corresponding to the start element transition, is applied to lead 430, which bit is inverted by inverter 205 to apply a "1" bit to gate 206. Since lead 501 normally has a "1" bit applied thereto, the output of gate 206 produces a "0" bit and inverter 208 applies a "1" bit to delay unit 209. Accordingly, when the data line is addressed during the next subsequent line scan period, a "1" bit appears at the output of delay unit 209 and is applied to counter section 202 and gate 207. As described hereinafter, the application of the "1" bit to counter section 202 results in the advance thereof and the application of a "0" bit to lead 501 during subsequent time slots individual to the data line. This produces a "1" bit at the output of gate 206 terminating the response of the gate to bits on lead 430 from stage 405. In addition, the application of the "1" bit to gate 207, with a "1" bit applied to the other inputs by lead 502, provides a "0" bit at the output thereof which is converted to a "1" bit by inverter 208 and applied to delay unit 209. This bit, with a 1.01 millisecond delay, is thus recirculated to provide a train of "1" bits at the output of start detector 201, each bit spaced 1.01 milliseconds apart and thus occurring as the data line is successively addressed. Similarly, a detected start transition from any other line provides a train of "1" bits concurrently with the addressing of the line and interspersed with the bit trains associated with other lines receiving data.

*Counter section*

Counter section 202 includes eight counter stages of which counter stages 210 through 212 and 216 through 217 are shown. Counter stage 210 is typical and similarly arranged as each of the other stages and includes delay unit 226, which delay unit is substantially identical to delay unit 209 and provides a delay of 1.01 milliseconds In addition to delay unit 226, counter 210 includes an add-one or half-adder circuit which includes inverters 221, 223, 225 and 228 and gates 222, 224 and 227. The two inputs to the half-adder circuit comprise the output of start detector 201 and the output of delay unit 226. The sum output of the half-adder circuit is obtained from the output of inverter 225 and applied to the input of delay unit 226 and the carry output is obtained at the output of inverter 228. The function of the half adder circuit is to apply at its sum output a "0" bit if the two input bits are both "0" or "1" and, conversely, provide a "1" at the output thereof it either one, but not both, of the input bits is "1." A "1" bit carry output is obtained if both input bits are "1."

Considering counter stage 210 in detail, the output of start detector 201 is applied to inverter 221 and to gate 224 in parallel. Accordingly, the input bit is applied to gate 224 and the inversion of the bit is concurrently applied to gate 222. The output of delay unit 226 is applied in parallel to gate 222 and inverter 223. Thus, the bit output of delay unit 226 is applied to gate 222 and the inversion thereof is concurrently applied to gate 224. The other inputs to gates 222 and 224 are connected to lead 502 which is normally in the "1" condition.

In the initial condition, the input to counter stage 210 and the output of delay unit 226 are in the "0" condition. Accordingly, during the time slot when a selected one of the data lines is addressed, a "0" bit is applied to each of gates 222 and 224. Thus, both gates provide a "1" bit at the output thereof, which is inverted by inverter 225 to a "0" bit and applied to the input of delay unit 226. Accordingly, a "0" bit sum is provided by inverter 225 and is recirculated through counter stage 210, appearing at the output of delay unit 226 during the time slot individual to the selected data line.

When start detector 201 detects a start pulse transition, a pulse is generated at the output thereof, as previously described, and concurrently applied to inverter 221 and gate 224. Since the other input leads to gate 224 are at this time in the "1" condition, as previously described, the output of the gate provides a "0" bit resulting in a "1" bit sum at the output of inverter 225 and in the application of the "1" bit to delay unit 226. When the selected line is addressed during the next scan cycle, this "1" bit appears at the output of delay unit 226 and start detector 201 applies another "1" bit to inverter 221. Accordingly, inverter 221 applies a "0" bit to gate 222 and inverter 223 applies a "0" bit to gate 224. Accordingly, a "1" bit appears at the output of both gates and inverter 225 passes a "0" bit sum to the input of delay unit 226. In the third scan cycle, when the selected data line is again addressed, start detector 201 again generates a "1" bit and delay unit 226 provides at the output thereof a "0" bit. Accordingly, the above-described two step cycle is again repeated.

The carry output of counter stage 210 is provided through gate 227 and inverter 228. Gate 227 applies a "0" bit to inverter 228 when "1" bits appear at both the output of delay unit 226 and the input of counter stage 210, inverter 228, in turn, applying a "1" bit carry to the input of counter stage 211. Since, as previously described. concurrent "1" bits are provided by the output of delay unit 226 and the output of start detector 201 during the second scan cycle and each alternate ones of the subsequent successive scan cycles, a "1" bit carry is thereby applied to counter stage 211 during alternate scan cycles. It is, of course, recalled that this bit also occurs concurrently with the addressing of the selected data line.

Counter stage 211 is arranged in the same manner as counter stage 210. Accordingly, when the first bit is applied thereto during the second scan cycle, a "1" bit sum is obtained and thus applied to the delay unit therein. During the third scan cycle the delay unit thus provides, at the output thereof, a "1" bit. Counter stage 210, however, does not apply a "1" bit carry to counter stage 211 during the third scan cycle, as previously described. Accordingly, "1" bits are applied to each of the input leads of the gate in counter stage 211 corresponding to gate 222 in counter stage 210. Thus, during the third scan cycle, a "1" bit sum is again obtained and is recirculated back through the delay unit in counter stage 211. The delay unit in counter stage 211 therefore provides a "1" bit at the output thereof during the fourth scan cycle and with a "1" bit being provided by counter stage 210, a "0" bit sum is obtained and applied to the input of the delay unit. In addition, the concurrence of the "1" bit at the output of the delay unit with the "1" bit provided by counter stage 210 results in the application of a "1" bit carry to the output of counter stage 211. During the next four scan cycles, this process is repeated, an output carry bit being produced by counter stage 211 and provided to the input of counter stage 212 during every fourth scan cycle.

In a similar manner, counter stage 212 inserts a "1" bit through the delay unit therein in response to the reception of the "1" bit from counter stage 211 during the fourth scan cycle, recirculates the "1" bit until the next bit is received from counter stage 211 during the eighth scan cycle and thereupon passes a "1" bit to the next successive counter stage and terminates the recycling of the "1" bit. The operation of counter stage 212 is then repeated for the next eight scan cycles and for each of the eight scan cycles thereafter.

In a similar manner, each of the subsequent stages, by virtue of the delay feedback, maintains a binary count or sum in response to carry outputs of the prior stage and provides a carry output to the subsequent stage when the prior stage carry and the binary sum are "1" bits. This provides the same function as a binary counter, the binary count being obtained at the sum outputs. Output leads $2^0$ through $2^7$ are obtained from the delay unit outputs, however. Accordingly, the count on leads $2^0$ through $2^7$ correspond to the count during the prior scan cycle. It is noted that these counts are obtained concurrently with the addressing of the selected data line. Similarly, if start detector 201 supplies "1" bits associated with other lines, these bits will be concurrently counted, the sum being obtained on leads $2^0$ through $2^7$ concurrently with the scanning of the associated line.

*Translator steering*

Leads $2^0$ through $2^7$ extend in multiple through cable 230 to translator steering section 203. Translator steering section 203 includes a plurality of gates such as gates 241 through 249 which gates selectively respond to a predetermined count of counter section 202, in accordance with the manner in which each gate is coupled to leads $2^0$ through $2^7$. For example, gate 244 is enabled by the advance of counter section 202 to a count of 96. This is accomplished by connecting lead $2^0$ through inverter 231 to one input of gate 244, connecting lead 24 through inverter 232, connecting leads $2^1$ through $2^3$ through inverters, not shown, connecting leads $2^5$ and $2^6$ directly and connecting lead $2^7$ through inverter 233 to the other inputs of gate 244. Accordingly, to apply "1" bits to all of the inputs to gate 244 the binary count of the counter, wherein the least significant digit is designated last, comprises the number 01100000 which is equivalent to 96. Similarly, gate 245 is selectively connected for the number 0 since all of the output leads of counter section 202 are applied thereto through inverters, such as inverters 234 and 235. In addition, gate 241 is selectively strapped to respond to the number 123, gate 243 is selectively strapped to respond to the number 95, and gates 246, 247, 248 and 249 are selectively strapped to respond to the numbers 3, 5, 8, and 9, respectively.

Recalling now that when the selected data line is in the idle condition, counter section 202 provides a 0 count concurrently with the addressing of the data line. This count functions to provide all "1" bits to the inputs of gate 245, as previously described. Accordingly, a "0" bit is produced at the output of gate 245, which bit is converted to a "1" bit by inverter 255 and applied to lead 265. Lead 265, in turn, extends to inputs of gates 508 through 511, FIG. 5. Assuming now that the scanned data line conveys ASA code, a "1" bit is also applied to lead ASA in line type selector circuit 120, lead ASA extending through cable 131 to the other input of gate 508. Accordingly, concurrently with the scanning of the idle ASA data line, gate 508 applies a "0" bit to an input of gate 520, and gate 520, in turn, thus applies a "1" bit to lead 501. Accordingly, in the initial idle condition "1" bits are applied by way of lead 501 to the input of gate 206 in start detector 201 concurrently with the scanning of the idle line.

Similarly, if the scanned idle line conveys 100 speed, 75 speed or 60 speed Baudot code, leads 100, 75 or 60 in line type selector 120 has a "1" bit applied thereto, which bit is thus applied to an input of gate 509, 510 or 511. Accordingly, the pulses one of gates 509 through 511 provides a "0" bit to the output thereof, whereby gate 520 applies a "1" bit to lead 501.

In addition, with the count of counter section 202 at 0 at least one of the input leads to gates 241 through 244 has a "0" bit applied thereto. Thus, gates 241 through 244 apply "1" bits to inverters 251 through 254, respectively, thereby producing "0" bits on leads 261 through 264. Leads 261 through 264, in turn, extend to inputs of gates 504 through 507, FIG. 5, whereby all of the inputs to gate 521 have "1" bits applied thereto. Gate 521 thus applies a "0" bit to inverter 522 and the inverter passes a "1" bit to lead 502, which lead, as previously described, extends to an input of gate 207 in start detector 201, to inputs of gates 222 and 224 of counter stage 210, and to the inputs of corresponding gates in the other counter stages. Thus, in the initial condition during the scanning of the selected line, "1" bits are normally applied to lead 502.

Recalling now that the detection of a start element transition initiates the generation of "1" bits by start detector 201 and advances the count of counter section 202, at least one of the inputs to gate 245 has a "0" bit applied thereto when this count is advanced. This provides a "1" bit to the output of gate 245, whereby inverter 255 applies "0" bits to gates 508 through 511. Accordingly, gates 508 through 511 apply "1" bits to gate 520 thereby producing a "0" bit on lead 501. Thus, as previously described, the output of gate 206 produces a "1" bit during each scan of the selected data line so long as the corresponding count of counter 202 is not 0.

Gates 246 through 249 of translator steering section 203 detect the cycle count which determines the appropriate interval for gating the character from the character cascade of FIG. 4 into the recirculation buffer FIG. 7. In the initial idle condition with counter section 202 at the count of "0," gates 246 through 249 are provided "1" bits at the outputs thereof. Inverters 256 through 259, in turn, apply by way of leads 266 through 269 "0" bits to the inputs of gates 512 through 515, respectively. Accordingly, gates 512 through 515 will apply "1" bits to gate 523. This results in the application of a "0" bit to lead L, which lead is connected to the output of gate 523. gate 523. This results in the application of a "0" bit to load and applies this "1" bit to don't load lead $\overline{L}$. Accordingly, in the initial condition, a "1" bit is applied to don't load lead $\overline{L}$, and a "0" bit is applied to lead L.

As previously described, gate 246 is enabled in response to the advance of counter stage 202 to the count of three. This, it is recalled, corresponds to five scanning cycles after character cascade stage 405 feeds out the start transition bit, since two additional cycles elapse due to the delay of delay unit 209 in start detector 201 and the delay units in counter section 202 such as delay unit 226. Since the duration of five scan cycles is approximately five milliseconds, it is apparent that, if the addressed line conveys ASA code, the bit corresponding to the approximate midpoint of the start element is concurrently appearing at the output of character cascade stage 405. Accordingly, when counting section 202 advances to the count of three, a "0" bit is provided to the output of gate 246 and inverter 256 accordingly applies a "1" bit to lead 266. Lead 266, in turn, extends to one input of gate 512 of FIG. 5. If an ASA code line is being scanned, line-type selector 120 applies a "1" bit to lead ASA. As lead ASA, in turn, extends to the other input of gate 512, a "0" bit is applied to an input of gate 523. Accordingly, a "1" bit is generated at the output of gate 523 and passed by way of lead L and multiple cable 527 to the recirculating buffer in FIG. 7. Concurrently, the "1" bit is applied to inverter 525, thus passing a "0" bit to don't load lead $\overline{L}$, lead $\overline{L}$ also passing through cable 527 to the recirculating buffer.

Similarly, if counter section 202 advances to the count of five simultaneously with scanning of a 100 speed Baudot line, gate 247 applies a "0" bit to inverter 257, which, in turn, passes a "1" bit by way of lead 267 to an input of gate 513. Since the other input lead to gate 513 has a "1" bit applied thereto by way of lead 100, a "0"

bit is passed to gate 523 thus applying a "1" bit to lead L and a "0" bit to lead $\bar{L}$. In a similar manner, if a 75 speed or 60 speed line is being scanned when counter section 202 advances to the count of eight or nine, gates 248 or 249 together with inverters 258 or 259 pass a "1" bit by way of leads 268 or 269 to gates 514 or 515. Accordingly, since leads 75 and 60 are connected to gates 514 and 515, respectively, a "0" bit applied to gate 523 resulting in the application of a "1" bit to lead 5 and a "0" bit to lead $\bar{L}$. It is thus seen that a read out signal is transmitted to the recirculating buffer by the translator circuit as the bit corresponding to the approximate midpoint of the start element is being fed out of character cascade stage 405. It is noted that during this interval each of the other stages are provided at the outputs thereof the bits corresponding to the midpoints of the subsequent code elements. Accordingly, recirculating buffer is enabled to read out the characters as described hereinafter.

As previously disclosed, translator steering section 203 restores start detector 201 and counter section 202 after the character is shifted through the character cascade. This operation takes place while character cascade stage 405 is feeding out the bits corresponding to the termination of the stop element.

With respect to ASA data lines, the character terminates approximately 100 scanning periods after the start element transition. After 98 scanning periods, however, counter section 202 is advanced to the count of 96, thus enabling gate 244. Accordingly, a "0" bit is applied to inverter 254, thus passing by way of lead 264 a "1" bit to an input lead of gate 507. Since a "1" bit is being concurrently applied to lead ASA, gate 507 applies a "0" bit to gate 521. Accordingly, gate 521 passes a "1" bit to inverter 522 which, in turn, applies a "0" bit to lead 502.

With a "0" bit on lead 502, gate 207 in start detector 201 passes a "1" bit to inverter 208 regardless of the output of delay unit 209. This reinserts a "0" bit in delay 209, restoring start detector 201 to the initial idle condition. Concurrently therewith, lead 502 applies a "0" bit to inputs of gates 522 and 524 in counter stage 210. Accordingly, a "1" bit is produced at the outputs of these gates regardless of the input bit provided by start detector 201 or the feedback bit provided by delay unit 226. Thus, inverter 225 inserts a "0" bit into delay unit 206 and the binary sum provided by stage 210 in the time slot of the ASA line is restored to 0.

Similarly, lead 502 applies "0" bits to each of the gates corresponding to gates 222 and 224 in each of the other counter stages. Accordingly, the counts in the other stages are restored to 0 in the same manner. Thus, with the recirculating bit removed from start detector 201 and the count of counter section 201 restored to 0, these circuits are restored to the initial idle condition, awaiting the next start pulse transition. With the count of counter section 202 restored to 0, gate 245 is again enabled and a "1" bit is reapplied to lead 501, as previously described. Gate 206 is thus enabled to respond to start bit transition when it is received from character cascade section 405.

In a similar manner, gates 241 through 243 enable inverters 251 through 253 to pass "1" bits to gates 504 through 506 when the count of counter section 202 reaches 155, 123, and 95, respectively. In the event that a 60, 75, or 100 speed line is being scanned, gates 504, 505 or 506 apply a "0" bit to gate 521. Accordingly, a "0" bit is applied to lead 502 to restore start detector 201 and counter section 202, as previously described. It is thus seen that as character cascade stage 405 feeds out the terminal portion of the stop element, the count is restored to "0" and start detector 201 again looks for the start pulse transition.

*Recirculating buffer*

The recirculating buffer comprises eleven recirculating buffer stages of which stages 700 and 705 through 710 are shown which stages are substantially identical in arrangement. Stage 710 functions to indicate if an overwrite condition occurs, as described hereinafter.

Considering now stage 700, this stage includes delay unit 728 which unit is identical to delay unit 209 in start detector 201 and provides a delay of 1.01 milliseconds. In the initial idle condition, a "1" bit corresponding to each of the scanned lines is being recirculated through buffer stage 700 via delay unit 728. This "1" bit is applied by delay unit 728 to inverter 727 and the resultant "0" bit is applied to gate 723. Gate 723, in turn, thus passes a "1" bit to gate 722 and, since lead $\bar{L}$ normally has a "1" bit applied thereto, a "0" bit is applied to inverter 726 which, in turn, applies a "1" bit to delay unit 728. Accordingly, in the initial idle condition, this "1" bit is repeatedly recirculated by buffer stage 700 through delay unit 728. In addition, since the delay of buffer stage 700 is the same as the scanning period, a "1" bit corresponding to each of the data lines are concurrently being recirculated in the stage.

Assuming now that a start pulse transition is received, that the approximate midpoint of the start element is passing out of stage 405, and that translator steering section 203 is concurrently providing a load command, a "1" bit is now applied to one input of gate 721 by way of lead L and a "0" bit is applied to the other input of gate 721 by way of lead 430. In addition, lead $\bar{L}$ is simultaneously applying a "0" bit to the input of gate 722. Accordingly, the outputs of both gates 721 and 722 are producing "1" bits and inverter 726 is thus applying a "0" bit to delay unit 728. This "0" bit then passes through delay unit 728 to inverter 727 whereby a "1" bit is applied to gate 723. As described hereinafter, lead 760 which comprises the other input to gate 723 normally has a "1" bit applied thereto. Accordingly, gate 723 passes a "0" bit to gate 722 and since lead L again has a "0" bit applied thereto, both gates 721 and 722 pass a "1" bit to inverter 726 which, in turn, applies a "0" bit to delay unit 728. It is thus seen that in response to the command signal from translator steering section 203, buffer stage 700 accepts the "0" bit at the output of character cascade stage 405 and recirculates the bit through delay unit 728.

Similarly, in the stages intermediate stages 700 and 705 and in stages 705 through 709, the bits at the outputs of the corresponding character cascade stages are accepted upon the load command from translator steering section 203 and recirculate therein at the scanning period rate. It is noted that the input to buffer 709 comprises lead 439 which, in turn, is connected to sample lead 113. Accordingly, the bit applied to stage 709 comprises the current sampling of the scanned data line. In the event that the scanned line conveys ASA code, this bit corresponds to the approximate midpoint of the first stop element. Since the stop element is a mark signal, a "1" bit is passed via lead 439 to gate 731 in stage 709. With lead L applying a "1" bit in response to the load command from the translator, gate 731 passes a "0" bit to inverter 736 which, in turn, applies a "1" bit to delay unit 738. Thus, a "1" bit is recirculated by stage 709 corresponding to the bit at the approximate midpoint of the first stop element of the scanned ASA line. Similarly, the stages intermediate stages 700 and 709 concurrently recirculate the bits corresponding to the approximate midpoint of eight intelligence elements of the ASA code.

In the same manner, if a Baudot code line is being scanned, the bit corresponding to the approximate midpoint of the stop element is applied to lead 436 by the character cascade and thus recirculated in buffer stage 706. Simultaneously therewith and in substantially the same manner, the bits corresponding to the approximate midpoint of the five intelligence elements are recirculated in the buffer stage 705 and the four buffer stages intermediate stages 700 and 705.

The output from buffer stage 700 is derived by way of gate 724 and gate 725 is passed by leads 729 and 730 through multiple cable 751 to the output register in FIG.

6. Similarly, the outputs of the buffer stages intermediate stages 700 and 705 and the outputs of buffer stages 705 through 710 are provided through gates corresponding to gates 724 and 725 and passed through similar leads in multiple cable 751 to the output register.

*Output register*

In general, the output register comprises an address portion, generally indicated by block 601, and the character portion, generally indicated by block 602. Character portion 602 includes eleven flip-flops of which flip-flops 620 through 626 are shown.

Recalling now that recirculating buffer stage 700 provides two outputs thereof, which outputs are applied to leads 729 and 730, it is noted that these latter leads extend to flip-flop 621 and specifically lead 729 is connected to the set input and lead 730 is connected to the reset input of flip-flop 621. Similarly, the output leads of the other recirculating buffer stages are connected to the set and reset input leads of corresponding flip-flops in character portion 602 of the output register.

Flip-flop 621, which is typical of the flip-flops in the several registers, also includes a "1" output lead which lead is driven to the "1" condition when the flip-flop is set and to the "0" condition when the flip-flop is reset, and a "0" output lead which is driven to the "1" condition when the flip-flop is reset. In the normal idle condition, flip-flop 621 is in the set state. Thereafter, any application of a"0" bit to the reset input lead changes the state of flip-flop 621 to the reset condition and the application of a "0" bit via lead 729 to the set input lead then restores flip-flop 621 to the set condition.

With flip-flop 621 normally in the set condition, as previously described, the "1" bit at the set output is applied by way of lead 628 to an input of gate 755 in FIG. 7, the other input to gate 755 extending by way of lead 325 to gate 324 in phasing circuit 318. As previously disclosed, gate 324 provides an output bit concurrently with the addressing of each of the data lines and with an average interval between the bits of approximately 62 microseconds. Accordingly, a "1" bit is applied to lead 325 concurrently with the addressing of one of the data lines whereby gate 755 produces at the output thereof a "0" bit when flip-flop 621 is set, which bit is inverted by inverter 757 and a "1" bit is then applied to lead 759. Concurrently therewith, gate 755 passes a "0" bit to lead 760.

Tracing lead 759 through multiple cable 761, it is noted that this lead provides one input to each of gates 724 and 725 in buffer stage 700. Tracing leads 760 through multiple cable 761, this lead extends to one input of gate 723. Accordingly, since a sample bit derived from the addressed line is concurrently appearing at the output of delay unit 728, this bit is applied to gate 724 and the inversion thereof to gate 725 concurrently with the application of the "1" bit via lead 759.

It is recalled that buffer stage 700 normally recirculates a "1" bit for each of the scanned lines and then, upon reading a start element out of the cascade stage 405, recirculates a "0" bit derived from the approximate midpoint of the start element received from the data line. If a "1" bit appears at the output of delay unit 728 when the "1" bit is also applied to lead 759, gate 724 passes a "0" bit to lead 729. This "0" bit is then passed to the set input of flip-flop 621. Since flip-flop 621 is normally in the set condition, however, the state of the flip-flop does not change. In the event, however, that a "0" bit appears at the output of delay unit 728, inverter 727 applies a "1" bit to gate 725 when the "1" bit is also applied by lead 759, thereby producing a "0" bit on lead 730. Accordingly, a "0" bit is applied to the reset input of flip-flop 621 and the state of the flip-flop is changed to the reset condition indicating the storage of a start element. Similarly, the bit circulating in each of the other buffer stages is passed to the flip-flop in character portion 602 of the output register whereby the corresponding flip-flops are placed in the reset condition in response to the recirculation of a "0" bit to designate a space element and are placed in the set condition in response to a recirculation of a "1" bit to designate the corresponding mark element.

Concurrent with the read out of the recirculating buffer, a "0" bit is applied to lead 760, as previously described, whereby a "1" bit is produced at the output of gate 723 which "1" bit is passed to gate 722. Since lead $\bar{L}$ normally has a "1" bit applied thereto, gate 722 passes a "0" bit to inverter 726 thus applying a "1" bit to delay unit 728. Accordingly, the read out of a buffer stage reinserts a "1" bit therein, thus restoring the buffer stage to the normal idle condition. In a similar manner, upon the application of the "0" bit to lead 760, "1" bits are recirculated in each of the other buffer stages thus clearing the character that had been read out from the buffer.

With a character registered in character portion 602 and the start element in flip-flop 621, flip-flop 621 is placed in the reset condition. In this condition, a "0" bit is applied to lead 628 and thence to gate 755. Accordingly, the output of gate 755 is maintained in the "1" condition and inverter 757 maintains lead 759 in the "0" condition precluding the subsequent read out of the buffer stages. In addition, gate 755 maintains lead 760 in the "1" condition enabling the normal recirculating of the data bits through gate 723 in buffer stage 700, and similarly through the corresponding gates in the other buffer stages.

Concurrent with the storage of the data character in flip-flops 621 through 626 in character portion 602, the address of the data line is stored in address portion 601. Address portion 601 comprises nine bit registers of which registers 606, 607, 608 and 609 are shown. Bit register 606, which is typical of the bit registers in address portion 601, includes flip-flop 612 and gates 610 and 611. One input of gates 610 and 611 is connected to lead 764 which, in turn, is connected to lead 759. As previously recalled, a "1" bit is applied to lead 759 when the data line is addressed and the character in the recirculating buffer is read out. The other input leads to gates 610 and 611 extend to double rail output leads 309 which, as previously described, are connected to the ninth stage of counter 315. Accordingly, concurrent with the read out of the recirculating buffer, the ninth digit of the address is applied by way of gates 610 and 611 to flip-flop 612. Similarly, each of the other eight digits of the address are stored in the other bit registers in address portion 601 concurrently with the read out of the recirculating buffer.

The outputs of the flip-flops in character portion 602 and address portion 601 are connected to a storage circuit indicated by block 603. Storage block 603 may comprise any well-known type of electronic or magnetic storage providing that the cycling time does not exceed 62 microseconds and, further, providing that a reset pulse is provided upon each cycle. This reset pulse may be applied as a "0" bit to lead 604; lead 604, in turn, extending the input set lead of flip-flop 621. Accordingly, upon read out of the registered character address, flip-flop 621 is restored to the normal set condition.

With flip-flop 621 in the set condition, a "1" bit is again applied by way of lead 628 to gate 755 and the register is again enabled to read out the characters from the buffer.

*Overwrite*

In some systems, it may be desirable to utilize store 603 as common equipment for other circuits. In this event, store 603 may not be able to restore the output register within the 62 second microsecond interval and flip-flop 621 is not restored to the set condition. Consequently, when the next "1" bit is applied by phasing circuit 318 to gate 755 by way of lead 325 with flip-flop 621 maintained in the reset condition, gate 755 does not produce a "0" bit at the output thereof. Accordingly, the read out of the next subsequent data line in the sequence prepared by phasing circuit 318 does not occur. In general, however, this character will be read out after the completion of the cycling by counter 315 when the next phasing pulse associated with the data line occurs. In the event, however, that store 603 is precluded from reading out the character for similar reasons during the next three cycles of counter 315, and, further, in the event that the translator circuit then attempts to read the next character from the character cascade to the recirculaing buffer, an overwrite occurs. The overwrite indication is provided by buffer stage 710.

Buffer stage 710 is substantially identical to buffer stage 700 with the exception that an input to gate 741, which gate corresponds to gate 721 in the buffer stage 700, is connected to the output of gate 723. In the event that the translator provides a load command while the prior character is still being recirculated in the buffer, a new character is read into the buffer from the character cascade overwriting and thereby deleting the prior character. At this time, the start bit of the prior character appears at the output of delay unit 728 whereby inverter 727 passes a "1" bit to gate 723 which, in turn, produces a "0" bit at the output thereof. Gate 723, in turn, applies the "0" bit to gate 741 concurrently with the application of a "1" bit thereto by lead L. Accordingly, gate 741 applies a "1" bit to inverter 746. Simultaneously therewith, lead $\overline{L}$ applies a "0" bit to gate 742 and gate 742, in turn, applies a "1" bit to gate 746. Consequently, inverter 746 passes a "0" bit to delay unit 748, thus indicating that an overwrite has occurred. A subsequent read out to the output register will pass a "0" bit to lead 750 and then to the reset input of flip-flop 620 in character portion 602 of the output register. This resets flip-flop 602 and upon the subsequent storage of the character in character store 603, an indication of the overwrite is passed to the store by flip-flop 602.

Although a specific embodiment of this invention has been shown and described, it will be understood that various modifications may be made without departing from the spirit of this invention and within the scope of the appended claims.

What is claimed is:

1. In a system for scanning a plurality of lines, each of said lines conveying data elements having a duration differing from the element duration of data conveyed by other of said lines, storage means, scanning means for consecutively scanning all of said lines and applying the element bits scanned thereby to said storage means, and variable delay means in said storage means responsive to said scanning means for delaying each bit applied to said storage means for an interval corresponding to said element duration of the data from whence said each bit is obtained.

2. In a system for scanning a plurality of lines, each of said lines conveying data elements having a duration differing from the element duration of data conveyed by other of said lines, said durations being substantially equal to an integral multiple of a common basic interval, storage means including a plurality of delay means, each of said delay means providing a delay corresponding to a separate one of said element durations, scanning means for consecutively scanning all of said lines within an interval corresponding to said basic interval and applying the element bits scanned thereby to said storage means, and means responsive to said scanning means for rendering operable said delay means corresponding to each element duration concurrently with said scanning of said line conveying data having said each element duration.

3. In a system for scanning a plurality of lines, each of said lines conveying data elements having intervals differing from element intervals of data conveyed by other of said lines, said intervals having a duration substantially equal to an integral multiple of a common basic interval, storage means including a plurality of delay lines, each of said delay lines providing a delay equal to an integral multiple of said basic interval, control means for interconnecting predetermined ones of said delay lines whereby a cumulative delay corresponding to a separate one of said element intervals is provided, scanning means for consecutively scanning all of said lines within an interval corresponding to said basic interval and applying the element bits scanned thereby to said storage means, and means responsive to said scanning means for rendering operable said control means concurrent with said scanning of said line conveying said element having said separate one interval.

4. In a system for scanning a plurality of lines, each of said lines conveying data elements having a duration differing from the element duration of data conveyed by other of said lines, a plurality of successive storage means including means for applying signal bits in each storage means to the next successive storage means, scanning means for consecutively scanning all of said lines and applying the element bits scanned thereby to an initial one of said storage means, and variable delay means in each of said storage means responsive to said scanning means for delaying each bit applied to said storage means for an interval corresponding to the element duration of the data from whence said each bit is obtained.

5. A shifting register for storing signal bits received from a plurality of lines, each of said lines conveying data elements having intervals differing from element intervals of data conveyed by other of said lines, said intervals having a duration substantially equal to an integral multiple of a common basic interval, comprising a plurality of successive storage means including output means for applying bits in each storage means to the next successive storage means, each of said storage means including a plurality of delay means, each of said delay means providing a delay corresponding to a separate one of said element intervals, scanning means for consecutively scanning all of said lines within an interval corresponding to said basic interval and applying the bits scanned thereby to an initial one of said storage means, and means responsive to said scanning means for rendering operable said delay means corresponding to each element interval concurrent with said scanning of said line conveying data having said each element interval.

6. A shifting register in accordance with claim 5 including a plurality of parallel read out means connected to said output means of said plurality of storage means and further means responsive to said scanning means for rendering operable said read out means concurrent with said scanning of said line.

7. A shifting register for storing signal bits received from a plurality of lines, each of said lines conveying data elements having intervals differing from element intervals of data conveyed by other of said lines, said intervals having a duration substantially equal to an integral multiple of a common basic interval, comprising, a plurality of successive storage means including means for applying bits in each storage means to the next successive storage means, each of said storage means including a plurality of delay lines, each of said delay lines providing a delay equal to an integral multiple of said basic interval, gate means for interconnecting predetermined ones of said delay lines whereby a cumulative delay corresponding to a separate one of said element intervals is provided, scanning means for consecutively scanning all of said lines within an interval corresponding to said basic interval and applying the bits scanned thereby to an initial one of said storage means, and means responsive to said scanning means for rendering operable said gate means corresponding to said each interval element concurrent with said scanning of said line conveying data having said each element interval.

8. In a system for scanning a plurality of lines, each of said lines conveying data elements having a duration differing from the element duration of data conveyed by other of said lines, store means, and scanning means for generating sequential cycles, each cycle having a plurality of time slots, each time slot being associated with a line and providing an interval for obtaining a signal bit from said associated line and applying said bit to said store means, characterized in that said store means includes means having variable delay apparatus for passing each bit applied to said store means to the output thereof after a delay interval having a duration equal to the element interval of the data from whence the bit is obtained, and said scanning means includes means for arranging the cycling rate to provide that the element durations of the data on all of the lines are individually an integral multiple of the duration of a scanner cycle whereby, during any time slot, the bit appearing at the store means output is necessarily derived from the line associated with the time slot due to the relationship in the durations of the data elements, the scanning cycle and the variable delays.

References Cited

UNITED STATES PATENTS 3,288,928 11/1964 Bartlett et al. -------- 178—50

ROBERT C. BAILEY, *Primary Examiner.*

G. SHAW, *Assistant Examiner.*